United States Patent [19]
Fornerod

[11] 3,751,169

[45] Aug. 7, 1973

[54] METHODS FOR DETERMINING THE POSITION OF A POINT IN SPACE RELATIVE TO A GEOMETRICAL LINE DEFINED BY AT LEAST TWO OF ITS POINTS AND INSTALLATION FOR PERFORMING SAME

[75] Inventor: Andre Fornerod, Cully, Switzerland

[73] Assignee: Tamper Inc., West Columbia, S.C.

[22] Filed: Dec. 21, 1970

[21] Appl. No.: 99,987

[30] Foreign Application Priority Data
Dec. 26, 1969 Switzerland.................... 19203/69

[52] U.S. Cl. ............. 356/152, 250/203 R, 356/141, 356/172, 33/1 Q, 33/287
[51] Int. Cl. ........................................ G01b 11/26
[58] Field of Search................ 250/225, 236, 203 R; 356/141, 152, 172, 138; 33/1 Q, 287

[56] References Cited
UNITED STATES PATENTS
| | | | |
|---|---|---|---|
| 3,107,168 | 10/1963 | Hogan et al. ......................... | 33/287 |
| 3,521,066 | 7/1970 | Joy et al. ............................... | 33/60 |
| 3,144,834 | 8/1964 | Stewart................................... | 33/60 |
| 3,251,261 | 5/1966 | Lillestrand........................... | 356/138 |
| 3,574,465 | 4/1971 | Poubeau ............................. | 356/152 |
| 3,349,244 | 10/1967 | Briggs et al. ..................... | 250/203 R |

FOREIGN PATENTS OR APPLICATIONS
1,259,961   3/1961   France................................ 356/152

*Primary Examiner*—Benjamin A. Borchelt
*Assistant Examiner*—S. C. Buczinski
*Attorney*—Smart & Bibbar

[57] ABSTRACT

There is provided a method and an apparatus for levelling and aligning railroad track by determining the position of a point on the track to be corrected relative to a geometrical line defined by at least two other points located on either side of the normal dropped from the point to be corrected on to the geometrical line. Each of the points defining the geometrical line is represented by a light source illuminating the point to be corrected and angular measurement apparatus fixed at the point to be corrected, for measuring the angles formed between the axis of the measuring apparatus and the axis of each of the light beams from the light sources.

3 Claims, 6 Drawing Figures

METHODS FOR DETERMINING THE POSITION OF A POINT IN SPACE RELATIVE TO A GEOMETRICAL LINE DEFINED BY AT LEAST TWO OF ITS POINTS AND INSTALLATION FOR PERFORMING SAME

BACKGROUND OF THE INVENTION

The present invention has for its object a method for determining the position of a point in space relative to a geometrical line defined by at least two of its points and a system for performing the process.

This invention can be especially advantageously applied to the resolving of problems in the railway field occurring relative to controlling and straightening the geometrical characteristics of a railway track, such as its alignment and longitudinal section.

In this field various measuring processes are known wherein the positional variations of a point of the track relative to its theoretical alignment are detected by means of appropriate devices called generally "reference bases" which are supported on the track and represent the desired alignment.

Two main types can be distinguished among these processes. The first consists of using so-called "absolute" reference bases to determine the successive positions of a movable point travelling over the track relative to a fixed reference defined by at least two fixed points selected on said track or a plane established from a fixed point selected on this track.

The other consists of determining with the aid of so-called "relative" reference bases the successive positions of a point travelling over the track, not in this case relative to a fixed reference point but relative to movable reference defined by an adequate number of points kept at constant distances from one another and which are moved along the track.

In the first process used mainly for straightening railway tracks during renewal work, the devices used are difficult to set up and the quality of the measurement can be influenced by the slightest variation in orientation of the measuring devices set up at the fixed reference points, particularly if the movable point to be measured is outside the reference points.

In the second process used either for the straightening of railway tracks during maintenance work or for controlling the geometrical characteristics of railway tracks, the devices used are generally complex, cumbersome and in particular do not in all cases permit the determination in all circumstances of the position of the detected point in space, i.e. in both planes, vertical for the section and horizontal for the alignment of the track.

SUMMARY OF THE INVENTION

The invention has for its object a measuring method which can be applied in particular in all fields of measuring the section and alignment of railway tracks whilst avoiding the disadvantages of existing processes by keeping the measuring apparatus used away from all disturbing influences due to possible variations in its orientation.

The method according to the invention consists of determining the position of a point P in space relative to a geometrical line defined by at least two points $N_1$, $N_2$ located respectively on either side of the normal dropped from point P onto said geometrical line.

This method is characterised in that each of the points $N_1$, $N_2$... $N_n$ defining said geometrical line is represented by a punctiform light source irradiating point P and that with the aid of an angular measurement apparatus fixed to point P and whereof the reference axis contains this point, simultaneously all the angles formed by the axis of the measuring apparatus and the axis of each of the light beams from the punctiform light sources, picked up by said apparatus are determined.

As the reference axis of the measuring apparatus always contains point P and as the angles are measured at point P relative to said axis it can easily be understood that the orientation of said apparatus is unimportant within the limits of its irradiation by the light sources.

Starting with the angular measurements supplied by the measuring apparatus and knowing the distances separating the various reference points, in known manner the variation between the checked point and the geometrical line defined by the reference points of the track is determined.

Each of these variations, represented by a signal resulting from the comparison of the angular measurement signals supplied by the measuring apparatus can either be memorised on a support point by point and as a function of the path covered for checking the geometrical characteristic of the track thus measured or, for the alignment of railway tracks, as a displacement control signal for the point on the track checked to bring it onto the geometrical line defined by the other reference points of said track.

The invention also comprises a device for performing the process. This device comprises a punctiform light source for each point selected defining the reference line and an optical apparatus for angular measurements of the type wherein the image of a punctiform light source is driven in uniform movement along a circular path centered on the axis of the light beam coming from said source and whereof the decentering relative to the optical axis of the apparatus, function of the angle formed by said optical axis with the axis of the light beam from the source, is measured by the difference in the times taken by the image to traverse the two arcs delimited by a slit in a focal screen passing through the optical axis and behind which are arranged detector cels, characterised in that the measuring apparatus is the combination of two image detector assemblies arranged symmetrically relative to the point of which it is desired to determine the position, whereby the functional members of the assembly are accurately aligned on a common longitudinal axis containing said point and whereof the rotating members are driven at the same angular velocity cy a common motor arranged between them.

Other characteristics such as the polarisation of the light sources and the optics, which are known per se, give the device, by their combination with the above-defined characteristics, the possibilities of performing the process according to the invention in all its applications.

BRIEF DESCRIPTION OF THE DRAWINGS

The following description, together with the drawings illustrating it permit a better understanding of the object of the invention.

This description and those drawings shown an exemplified embodiment of a device permitting the performance of the process according to the invention, as well as its operation.

DESCRIPTION OF THE PREFERRED EMBODIMENT

Figure 1:
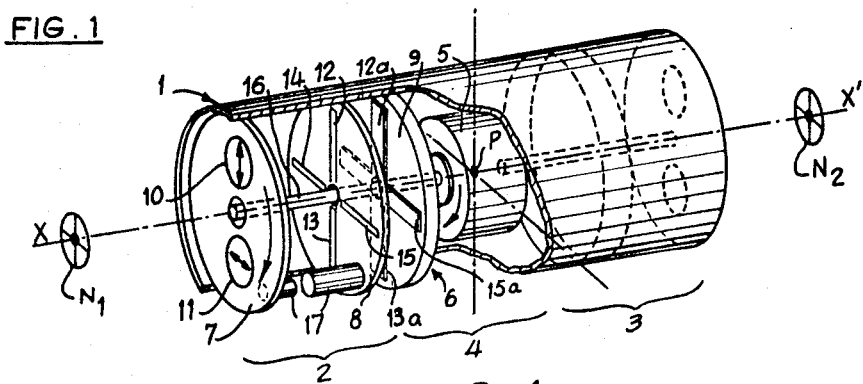
FIG. 1 shows diagrammatically the device according to the invention.

The measuring apparatus 1 in FIG. 1 comprises two identical assemblies 2 and 3, whereof the functional members are accurately aligned on a common longitudinal axis XX' forming the reference measurement axis.

These two assemblies are separated by a central compartment 4 containing a motor 5 for synchronously driving the rotating members of the two assemblies.

Each of the two assemblies 2 and 3 comprises, starting from its free end, three members centered on the common longitudinal axis XX':

A revolving screen lens holder 7.

A fixed focal screen with slits 8.

A fixed receiver with photosensitive detector cells 9.

The revolving screen 7 disposed in a plane perpendicular to the longitudinal axis XX' has two convergent lenses 10 and 11, diametrically opposed to the XX' axis in positions symmetrical thereto.

These two lenses are polarised and orientated in such a way that their polarisation axes are perpendicular to one another, the polarisation axis of one of these two lenses 10 being itself parallel to a diameter of the screen, or in a more developed design inclined at 45° relative to this diameter, as will be described hereinafter.

The focal screen 8 having slits, normal to the longitudinal axis XX' is located substantially at the distance corresponding to that of the focal plane of the lenses of the revolving screen. On this screen there are four slits 12, 13, 14 and 15 made in pairs along two perpendicular axis intersecting on the longitudinal axis XX', each on one side of this axis, thus delimiting four opaque zones.

Figure 7:
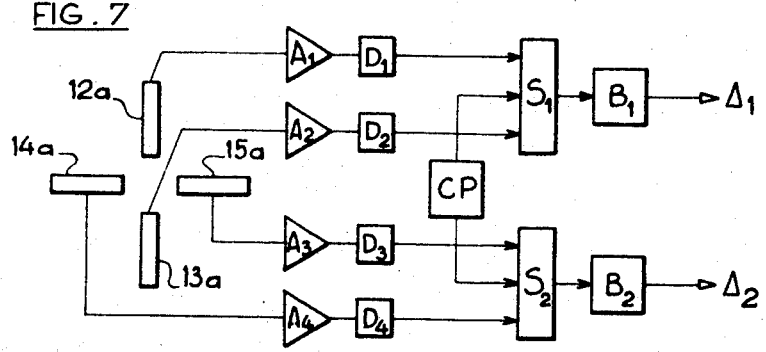

The fixed receiver 9 is equipped on its surface directed towards the focal screen 8 with four photosensitive cells 12a, 13a, 14a and 15a, for example solar detector cells, each arranged in the axis of each of the four slits of the focal screen (12a in the axis of slit 12, 13a in the axis of 13, etc), and on its opposite surface at 6 with the electronic circuits necessary for the amplification and shaping of the signals received. In said electronic circuits which are known and shown in FIG. 7, the signals from the cells 12a and 13a, respectively 14a and 15a, are amplified by amplifiers $A_1$ and $A_2$, respectively $A_3$ and $A_4$, and then filtered by amplitude distinguishing units $D_1$ and $D_2$, respectively $D_3$ and $D_4$ for eliminating the information from the environing light, and directed towards two selector groups $S_1$, respectively $S_2$, in which the signals from cells 12 a and 13a, respectively 14a and 15a, which have been amplified and filtered direct the pulses of a clock pulse CP either by counting or by discounting on two bi-directional counters $B_1$, respectively $B_2$, of which the output information $\Delta_1$, respectively $\Delta_2$, equals the difference between the number of pulses which have been counted and that of pulses which have been discounted, such a result being directly proportional to the difference in the times taken by the image of the detected light source to traverse the arcs 12a-13a and 13a-12a, respectively 14a-15a and 15a-14a.

Each revolving screen is mounted on a shaft 16 whose rotation axis coincides with the longitudinal axis XX' of the measuring apparatus. This shaft passes freely through the focal screen 8 and receiver 9 of each assembly to reach the motor 5 in the central compartment 4 which motor 5 rotatably drives the shaft.

In addition, focal screen 8 has on one of the zones delimited by two consecutive slits, a revolution counter selector 17 comprising a detector on the focal screen 8 and a reference on the revolving screen 7 (an electromagnet, for example).

This measuring apparatus functions as follows:

It is assumed in order to simplify matters that there are two non-polarised light sources $N_1$ and $N_2$, each of them irradiating one side of the measuring apparatus. In addition, again for simplicity, it is assumed that the revolving screen 7 of each assembly only has one non-polarised convergent lens at a certain distance from the rotation axis of said screen.

When each screen revolves, driven by the motor, the image of the light source which is opposite thereto is a light point which traverses a circle in the focal screen plane.

If the circle-image is centered on the axis of the apparatus, it is because the light source itself is on this axis; any displacement of the source will cause a decentering of the circle-image which is a function of the angle formed by the axis of apparatus and the axis of the light beam from the same source, intercepted by the measuring apparatus.

If therefore the time taken by the image to traverse each of the two arcs delimited by a slit in the screen is measured and these times are compared, their difference is a function of the decentering of the circle-image and therefore of the above-defined angle. The time base used here is a high frequency pulse generator and this time is measured between a pulse on a receiver cell and a pulse on the cell diametrically opposite to a slit.

Figure 2:
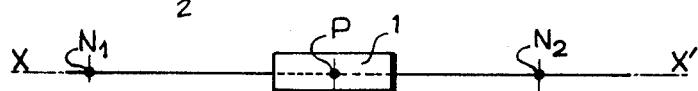
FIGS. 2 to 5 illustrate the description of the operation of the device according to the process of the invention.
Figure 3:
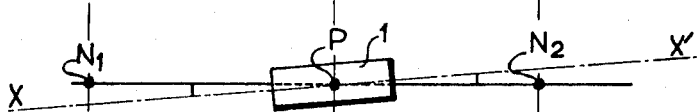

It is therefore apparent from the design of the measuring apparatus that if the circle-image is concentric to the XX' axis of the apparatus and the two sides, the three points represented by the two light sources $N_1$, $N_2$ and the point P of the apparatus are aligned as shown in FIG. 2; in this case the measured angles are zero. If, without changing the position of the three points $N_1$, $N_2$ and P, the apparatus is rotated slightly, i.e. axis XX' about point P, as shown in FIG. 3, two equal angles $N_1PX = N_2PX'$ will appear and their difference is zero, meaning that the three points $N_1$, $N_2$ and P are aligned.

Whatever the alignment of the XX' axis of the measuring apparatus it will always be possible to check the alignment of the three points $N_1$, $N_2$ and P in the irradiation limits of the measuring apparatus by the light sources.

Figure 4:
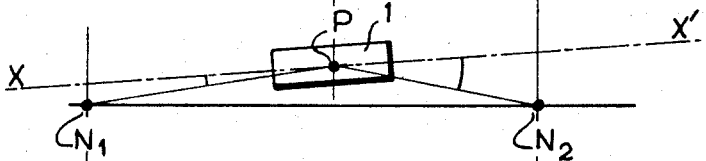

On the basis of analogous reasoning any divergence of point P from the straight line $N_1$, $N_2$, as shown in FIG. 4, can be defined by the same value of the difference of the angles $N_1PX$ and $N_2PX'$, whatever the orientation of the measuring apparatus axis relative to the straight line $N_1$, $N_2$.

Thus, with the two perpendicular slits and the four detector cells, it is possible to determine the position in space of point P relative to the straight line defined by light sources $N_1$, $N_2$ and in the two perpendicular planes defined by the two slits and intersecting on XX'.

Figure 5:
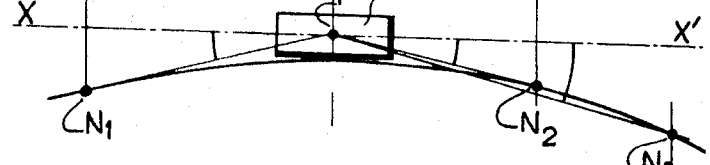

In the special case of measuring the alignment along a railway track, it is necessary to refer not only to straight lines but also to curves using, for example, so-called "four point" reference bases, of which three define the curve, the fourth being that of which it is desired to determine the position relative to said curve as shown in FIG. 5.

To this end the measuring apparatus according to the invention comprises, as described revolving screens having two lenses polarised perpendicularly to one another.

It is assumed that the two sources $N_1$ and $N_2$ are polarised, for example vertically, and that a third source is polarised horizontally from the side of $N_2$ and defines with the two forming a circular arc $N_1$, $N_2$, $N_3$.

Figure 6:
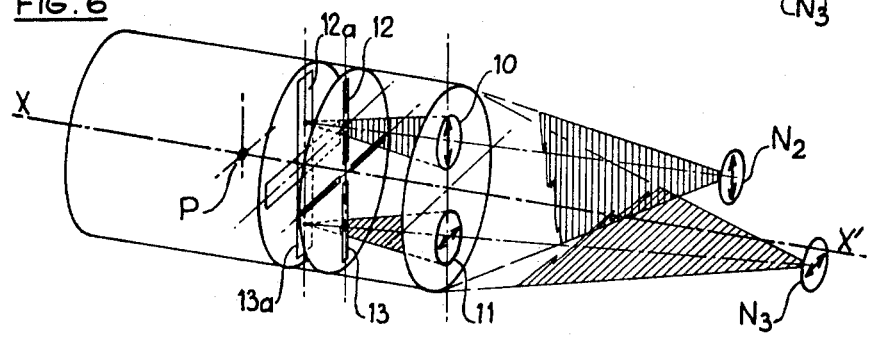
FIG. 6 is a diagram showing the principle of measurement with at least three sources, two being on the same side of the apparatus.

It is also assumed that the apparatus is positioned at point P and that slit 12-13 is orientated vertically, according to FIG. 6.

From the side source $N_1$ which is vertically polarised (FIG. 5), a pulse occurs each time a lens has its vertical polarisation axis, in other words, each of the two lens gives a pulse on the corresponding cell of the two vertical and horizontal slits.

From the side of the two sources, $N_2$ polarised vertically and $N_3$ polarised horizontally (FIG. 6), each time source $N_2$ generates a pulse in the vertical plane, source $N_3$ simultaneously generates a pulse in the same vertical plane but from the opposite side of the XX' axis of the apparatus and inversely to the following half-turn.

It is thus possible to determine simultaneously the angular position of the two sources $N_2$ and $N_3$ relative to the axis of the apparatus in the vertical plane. The principle is identical from this same side in the horizontal plane.

It is thus possible to determine simultaneously:

In the vertical plane the height position of point P (function of angular measurements) relative to the straight line joining the two points $N_1$ and $N_2$.

In the horizontal plane the position of this same point P relative to the circular arc defined by the three points $N_1$, $N_2$ and $N_3$.

Figure 8:
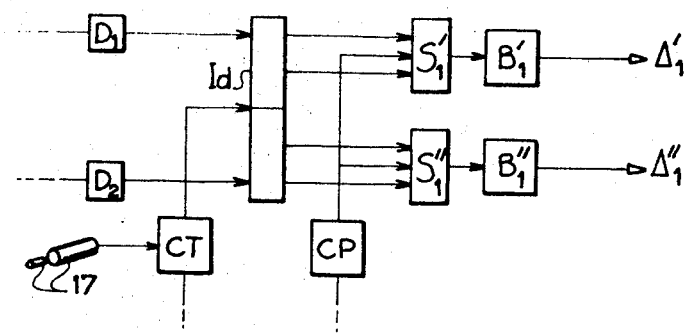

It is however indispensable when using two sources polarised perpendicularly to one another on the same side of the apparatus, to place a revolution counter selector 17 in one of the ranges delimited by two consecutive slits to direct one pulse out of two towards a first shaping circuit which corresponds to one of the two light sources, and the second pulses towards a second shaping circuit which corresponds to the other source. The distinguishing circuits are schematically and partly shown in FIG. 8 which shows only the processing of the signals from cells 12a and 13a, the processing of the signals from cells 14a and 15a being identical. FIG. 8 shows an identification block $I_d$ receiving the signals from the amplitude distinguishing units $D_1$ and $D_2$ of FIG. 7. Such an identification block $I_d$ receives the pulses of a revolution counter CT which is controlled by the electromagnet 17 (as described in connection with FIG. 1), and at each revolution directs alternatively the signals from the cells towards two circuits which are identical to those described above and comprise two selector groups $S_1'$ and $S_1''$ which direct the pulses from clock CP towards two bi-directional counters $B_1'$ and $B_1''$ giving output signals $\Delta_1'$, respectively $\Delta_1''$, from for example sources $N_2$, respectively $N_3$ (as shown in FIG. 6).

Another advantage inherent in this characteristic of the device according to the invention is the possibility of simultaneous measurements on two bases of three points of example, of different lengths by the tolerance of the polarisations of two groups of two different sources, the measuring apparatus being placed between these two groups.

An interesting variation can be made in the inclination of the polarisation axis of the lenses and the sources by 45° relative to the vertical, e.g. as described in the description of the measuring apparatus. The importance is in the use of the device in the measurement of railway tracks where both the rails and equipment used present the maximum of their reflecting surfaces in vertical and horizontal planes. At 45°, i.e. in two intermediate orthogonal planes, the quasi-totality of the reflected rays which could influence the quality of the measurements made are eliminated.

All variants can be made by the skilled expert without departing from the scope of the invention.

What we claim is

1. Apparatus for determing the position on a point P in space relative to a geometrical line defined by at least two points $N_1$, $N_2$ located on either side of the normal dropped from point $P$ on to said geometrical line comprising a punctiform light source for each point selected defining the reference line and an optical apparatus for angular measurements of the type wherein the image of a punctiform light source is driven in uniform movement along a circular path centered on the axis of the light beam coming from said source and whereof the decentering relative to the optical axis of the apparatus, function of the angle formed by said optical axis with the axis of the light beam from the source, is measured by the difference in the times taken by the image to traverse the two arcs delimited by a slit in a focal screen passing through the optical axis and behind which are arranged detector cells, characterized in that the measuring apparatus is the combination of two image detector assemblies arranged symmetrically relative to the point of which it is desired to determine the position, whereby the functional members of the assembly are accurately on a common longitudinal axis containing said point and whereof the rotating members are driven at the same angular velocity by a common motor arranged between them and each of these two assemblies comprising a revolving screen lens holder; fixed focal screen with two perpendicular slits intersecting on the longitudinal axis common to both assemblies; a receiver with photosensitive cells arranged in the axis of each of the slits of the focal screen and including the circuits for the simplification and processing of the signals received.

2. Apparatus according to claim 1 characterized in that it comprises: at least three sources of which two irradiate the same assembly, each polarized perpendicular to the other, the polarization axis of one of them being substantially vertical; two symmetrical lenses, diametrically opposite on the revolving screen, each polarized perpendicular to the other, the polarization axis of one of them being parallel to a diameter of the screen; a revolution counter selector arranged on one of the zones delimited by two consecutive slits of the focal screen.

3. A method for determining the condition of a railway track, wherein the position of regularly spaced points of said track is successively measured with respect to a geometrical line defined by at least two other points of the track which are respectively located at fixed distances on either side of each of said measured points, wherein reference points of said track are materialized by punctiform light sources the angular position of which is detected and measured with respect to the optical axis of an optical measuring image detecting apparatus in which the image of a punctiform light source is driven in uniform movement along a circular path centered on the axis of the light beam coming from said source to produce a circle-image of which the decentering relative to the optical axis of the apparatus gives a measurable function of the angle formed by the optical axis and the axis of the light beam, and wherein the position of the measured point is determined by means of the angular measures thus obtained as well as of the known and fixed distances separating said points of the track, characterized by the simultaneous measurement-by means of an optical measuring apparatus comprising two image detector assemblies located symmetrically on a common optical axis upon which the circle-image producing rotating means are driven synchronously, said optical apparatus being located at the measured point and its optical axis containing said point — of all the opposite angles which are formed by said optical axis and the axis of each light beam from said light sources which are picked up by said optical apparatus, so that the position of the measured point is always determined independently of any possible variation in the orientation of the optical axis of said optical measuring apparatus, the algebraic sum of the angles thus obtained remaining constant.

* * * * *